United States Patent [19]

Flork

[11] Patent Number: 4,814,147

[45] Date of Patent: Mar. 21, 1989

[54] COLUMN FOR PHYSICAL OR CHEMICAL TREATMENT IN HETEROGENEOUS PHASE

[75] Inventor: Michel Flork, Chamalieres, France

[73] Assignee: Laboratories Flork, S.A., Nontglandier, France

[21] Appl. No.: 87,502

[22] PCT Filed: Nov. 26, 1986

[86] PCT No.: PCT/FR86/00404

§ 371 Date: Aug. 27, 1987

§ 102(e) Date: Aug. 27, 1987

[87] PCT Pub. No.: WO87/03217

PCT Pub. Date: Jun. 4, 1987

[30] Foreign Application Priority Data

Nov. 27, 1985 [FR] France .................................. 8517898

[51] Int. Cl.⁴ .............................................. B01J 8/02
[52] U.S. Cl. .................................... 422/216; 422/211; 422/212; 422/213; 422/214; 210/268; 210/290
[58] Field of Search ................................. 422/211–216; 210/268, 290

[56] References Cited

U.S. PATENT DOCUMENTS

| | | | |
|---|---|---|---|
| 1,624,614 | 4/1927 | McGill | 210/290 |
| 1,759,013 | 5/1930 | Lancaster | 210/290 |
| 1,787,698 | 1/1931 | Montgomery | |
| 2,460,036 | 1/1949 | Sebald | |
| 2,782,726 | 2/1957 | Perrin | |
| 3,771,659 | 11/1973 | Fraser | |
| 3,928,193 | 12/1975 | Melaja | |
| 4,139,473 | 2/1979 | Aldredge | 210/290 |

FOREIGN PATENT DOCUMENTS

| | | | |
|---|---|---|---|
| 2143100 | 3/1972 | Fed. Rep. of Germany | 210/290 |
| 2000042 | 1/1979 | United Kingdom | 210/290 |

Primary Examiner—Barry S. Richman
Assistant Examiner—Timothy M. McMahon
Attorney, Agent, or Firm—Lee C. Robinson, Jr.

[57] ABSTRACT

A reaction column for the physical or chemical treatment of a solution in heterogeneous phase. Such a column operates under a pressure substantially equal to the height of charge in the column; its lower part is conical, the lining comprises a static component and, arranged within the cone, layers of inert materials of a size and density increasing from the top to the bottom; a free height being left between the top of the upper layer and the top of the column.

10 Claims, 1 Drawing Sheet

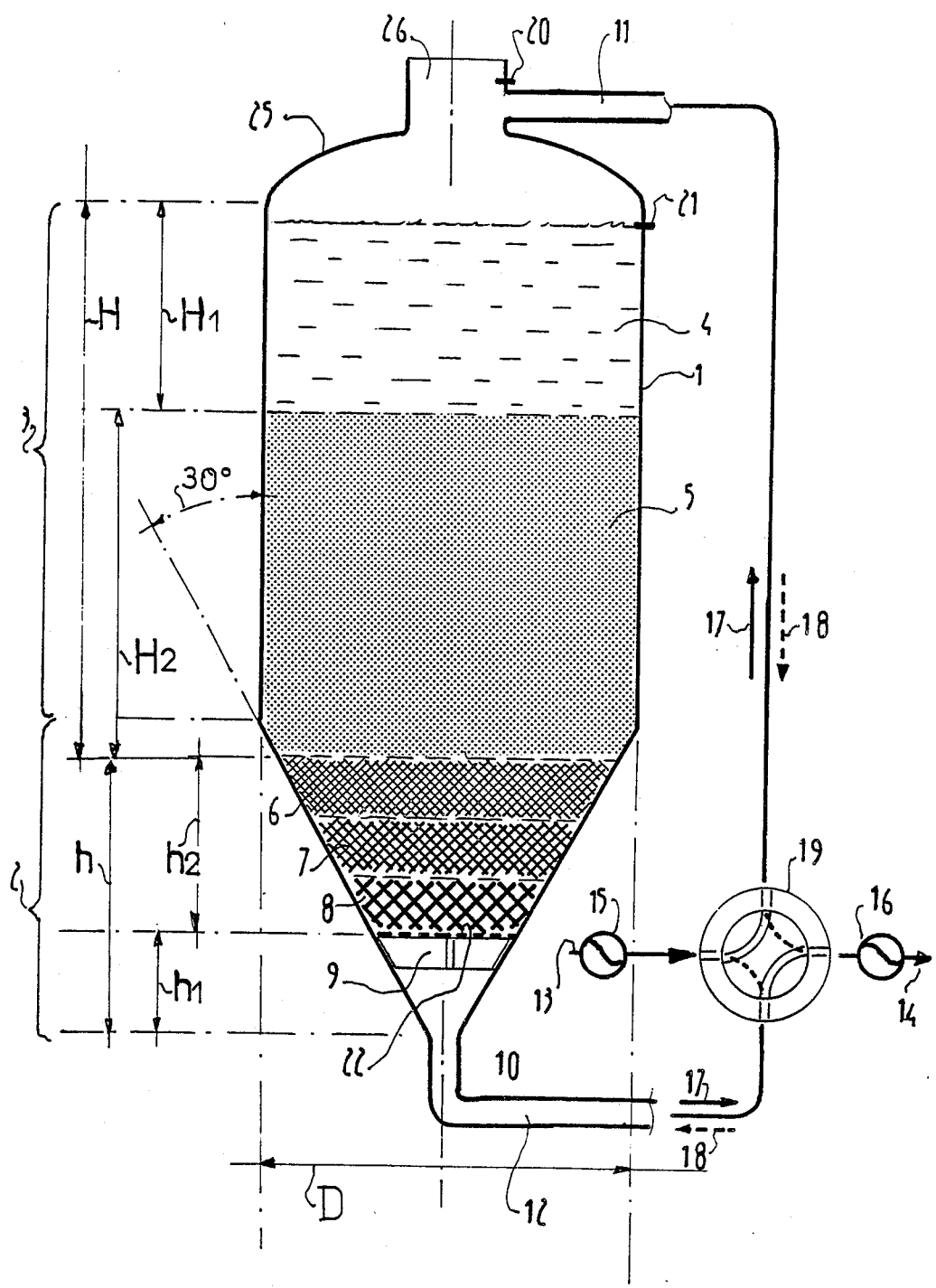

COLUMN FOR PHYSICAL OR CHEMICAL TREATMENT IN HETEROGENEOUS PHASE

BACKGROUND OF THE INVENTION

1. Field of the Invention

The present invention relates to a reaction column intended for the treatment of a solution in contact with a static solid component, and, subsidiarily, the method of using such a column.

2. Description of the Prior Art

Reaction columns are known through which there can be passed a liquid component, referred to as solution, to be treated in contact with a solid static component which is generally divided into grains, such as a catalyst, a resin ion exchanger, molecular sieve or the like. Generally, such columns are formed of a vertical enclosure having orifices for the passage of the solution at its upper and lower ends. Such columns can only be of small diameter in order to avoid preferential flow in the center and neutral zones which do not fail to occur as soon as the diameter of the column becomes substantial as compared with its height and the diameters of its inlet and outlet orifices. The formation of neutral zones and, correlatively, of zones of preferential flow which are generally located in the center of the column is harmful since it causes, at the outlet, heterogeneous mixtures of solutions which have undergone the action of the static component to very different extents.

Such columns have rather thick walls in order to withstand the expansion of the solid component which can take place during the course of the treatment. This expansion of the static component is generally accompanied by a deformation of its grains, resulting in their dislocation and finally in an increase in the loss of head which opposes the circulation of the flow. In order to assure a sufficient velocity of flow, it is then necessary to increase the pressure to very high levels which constitutes a second technological brake on the possibilities of increasing the diameter of the column.

SUMMARY

The object of the present invention is to ovecome these drawbacks by imparting to the column a shape and proportions which, in cooperation with densimetric and granulometric characteristics of the solid components which it contains, permit a uniform percolation of the solution and a natural reclassification of the solid components in a situation of reverse passage.

In accordance with the present invention, there is provided a reaction column of the type intended for the passage of a liquid component, referred to as solution, which is to be treated in contact with a solid, static component divided into grains such as a catalyst, ion exchange resin, molecular sieve or the like. The column is formed essentially of a vertical enclosure comprising at least two passage orifices for said solution, one at its upper part and the other at its lower part. The characteristic is pressure prevailing in the lower part of the column is substantially equal to the height of charge of the solution in the upper part so that the flow of the solution through the static component results primarily from its gravity. This occurs because the lower part of the said enclosure is of a generally substantially conical shape, and because the inner volume of this conical part is partially filled with a mass of divided materials which are inert towards said solution. These materials are arranged in horizontal layers formed of particles of a size which increases in a discontinuous manner from their upper layer to their lower layer. The densities of the particles are at least equal to those of the static component or of the solution, and the density of the particles of the lower layers are at least equal to that of the upper layers.

Thus the particle size of the inert materials arranged in the conical part is coarser than that of the reactive static component and is coarser in each layer than that of the upper layer. Furthermore, the density of the inert materials is greater than that of the reactive static component and, within each layer, is greater than or equal to that of the layer which is above it. The relative increase of the interstitial voids thus compensates for the reduction in the cross section upon descent on the conical frustum. This arrangement makes it possible to obtain a uniform flow up to the outlet nozzle, which finally contributes towards avoiding the above disturbances.

According to another general arrangement, a height H1 which is free of static component is allowed to remain above the static component so that this space, although subsequently filled with solution, can be used by the static component for its expansion. It should be noted that this free height H1 is determined by the ability of the static component to expand and can therefore not be determined a priori.

According to more specific features, the smallest dimension of the particles of one layer is greater than the largest dimension of the interstices present between the particles of the immediately lower layer while the largest dimension of the interstices present between the particles of the upper layer is less than the smallest dimension of the grains of the static component. Preferably, the inert materials are divided into three layers of particles of different particle sizes, the particle size of the particles of one and the same layer being substantially homogeneous. Preferably, furthermore, these inert materials are arranged over a grating the openings of which have dimensions less than the smallest dimension of the particles of the adjacent layer. This grating rests on a support, known as a spider, formed of plates which are connected centrally at their edge.

According to other secondary features, the upper part of the enclosure being cylindrical, the ratio of its height H to its diameter D is at least equal to 1.2 (H=1.2D); the opening angle of the cone of the lower part is between 25° and 35°; and the lower surface of the lower layer of inert material is located at a distance h1 from the lower end of the cone, h1 being between 0.25D and 0.35D.

According to another characteristic feature related to the manner of use of a column according to the invention, an upper conduit and a lower conduit which is connected axially to the lower end of the cone are connected to a 4-way valve which, in its turn, receives an inlet conduit and an outlet conduit. The function of this 4-way valve is alternately either to: (1) place the upper conduit in communication with the inlet conduit and the lower conduit in communication with the outlet conduit or, (2) to place the lower conduit in communication with the inlet conduit and the upper conduit in communication with the outlet conduit. A charging pump and an the emptying pump are mounted upstream and downstream of the 4-way valve on the inlet and the outlet conduits respectively.

When several columns are connected in series, the outlet conduit of one constitutes the inlet conduit of the following one, and the emptying pump of the first constitutes the charging pump of the second, etc.

According to another advantageous arrangement, the column of the invention comprises at least two devices for detecting the presence of the solution, referred to as level detectors. One of these is a high level detector located below the point of discharge of the upper conduit into the column and the other, is a low level detector, located below the said point of discharge and above the upper level of the said static component.

The various features indicated above, which are preferably combined with each other, have the result of assuring a linear velocity of the solution which is equal to itself practically at any point in the mass of the static component. It permits a relatively small diameter of the inlet and outlet conduits which is compatible with the diameter of the pump inlet and outlet without affecting the isokinetic character of the passage of the solution through the static component. It avoids "dead" spaces, which are frequently the cause of heterogeneity of treatment, and finally, it permits a simple and almost indefinite regeneration of the static component (within the theoretical limits of use of the latter) by the simple operation of the 4-way valves.

The present invention will be better understood and details thereof will become evident from the following description of a preferred embodiment of a column according to the invention and an example of its use, read in conjunction with the accompanying drawing.

BRIEF DESCRIPTION OF THE DRAWING

The single drawing FIGURE is a diagrammatic view, with portions shown in section, of a treatment column in accordance with an illustrative embodiment of the invention.

DESCRIPTION OF A PREFERRED EMBODIMENT

Referring to the drawing, a treatment column 1 according to the invention is formed essentially of a cylindrical part 3 arranged on top of a conical part 2; the conical part 2 is filled over an upper part h2 of its height with three layers 6,7,8 of an inert organic or inorganic material; the inert material is supported by a perforated plate 22, which in its turn is supported by a spider 9 at a height h1 above the lower end 10 of the cone. The cone has an opening of an angle of 30° and its lower end is extended by a lower conduit 12. The upper end of the column 1 is partially closed by a ring or cover 25 having a manhole 26 which may or may not be closed; an upper conduit 11 debouches into the column at the level of the manhole.

To give an idea of the proportions of the parts indicated above, they will be defined as a function of the diameter D of the cylindrical part; thus, in this particular case, H=1.32D, h1=0.28D, h2=0.24D.

The cylindrical part is partially filled over a height H2 by a divided solid static component 5, which may be a chemical or bio-chemical reagent, a catalyst, an anionic or cationic ion exchange resin, a complexing resin, a carbon, a molecular sieve, silica gel, etc. This static component constitutes, in the broad sense, a reagent which acts by absorption, adsorption, permanent or temporary chemical bonding or any other physical effect. It will be noted that the height h2 of the static component is surmounted by height H1 of a free space intended to permit, if necessary, the expansion of the static component. This space of height H1 can be occupied by the solution 4 to be treated, which of course fills all the other remaining spaces in the column between the grains of the static component and the particles of the divided material of the cone. Due to this arrangement, the circulation of the solution takes place uniformly over the entire column without a preferential circuit, particularly at the center.

It will furthermore be noted, as already stated above, that the density of the grain of the particles referred to above, as well as their particle size, preferably increases from the top towards the bottom. The arrangement makes it possible to cause a solution liquid to be treated, or a regenerated solution liquid, to flow from the bottom upwards, which has the particularly interesting effect of simultaneously favoring an untamping of the static component and of permitting a reclassifying of the various reactive or inert layers if there have been accidental phenomena of migration.

This inversion of the direction of operation of the column can be conveniently effected by means of a 4-way valve 19 connected on the one hand to the upper conduit 11 and the lower conduit 12 and on the other hand to an inlet conduit 13 and an outlet conduit 14. The inlet (or arrival) conduit 13 passes through a charging pump 15 while the outlet conduit 14 passes through an emptying pump 16. Depending on the position of the "turning element" of the 4-way valve, a direct circuit in accordance with the solid-line arrows 17 or an inverse circuit in accordance with the dashed-line arrows 18 is established within the column.

A column according to the invention also advantageously comprises automation and regulating devices; the main regulating element, which however is not limitative, consists of level detectors or else a detector of the presence of the solution, the one known as the high level detector assuring, for countercurrent operation, the stopping of the feeding of the column, while in the opposite direction, the low level detector 21 assures the stopping of the emptying. One thus avoids either overflow or the placing of reagent in contact with the ambient air. This device can be comprised of any integral or derivative proportional regulator eliminating phenomena of oscillation to assure continuous operation.

The automatic operation of the column is assured by electronic devices which employ programs to pilot the operations by the action of solenoid valves, as a function of continuous measurements on the inlet and outlet solutions (pH, redox potential, temperature, refraction, turbidimetry, resistivity or any other significant characteristic).

A determining development of the adjustments and automatic action is made possible by the very conditions of operation of the new columns: upper part at atmospheric pressure and lower part under a slight vacuum (or slight pressure in countercurrent operation). These conditions, in fact, considerably simplify the continuous follow-up of the various physical or chemical data taken into account and frequently make it possible to assure their reliability. This is not technologically possible under high pressure.

By way of example, the reactive static component may be an ion exchange resin; it preferentially retains, in this order, three organic products, A,B,C, in a solution. The column will first of all retain all of product A, then all of product B and finally only all of product C.

By means of successive passages through the column, alternating with elutions, one can then separate the product A, the product B and the product C without mixing them. It is of course possible to carry out these operations on an industrial plane and to automate them because all the elementary streamlines flowing in the column experience the same reaction time due to the elimination of the preferential flows.

By way of example, waters which are highly charged with electrolytes are treated in a purification station comprising various successive operations. One of them consists of subjecting them to the action of a cationic resin in a column. The column is formed of a cylindrical portion (diameter 2 m, height 2.43 m) which is arranged on top of a conical frustum, the apex angle of which is 30°. Its volume is 8 $m^3$ with an upper opening of 0.5 m. The cylindrical portion is charged with 5 $m^3$ of Amberlite Resin IRC 120 which occupy a height of 1.59 m., namely 65% of the available height. The conical frustum is filled with three layers of siliceous gravel of 0.33 m. in thickness. The gravel is supported by a PVC plate of 0.65 m. in diameter and 10 mm. in thickness. This plate is pierced by 400 holes of a diameter of 8 mm. and is covered with a screen cloth of a mesh opening of 0.5 mm.

The resin is present in the form of balls of a diameter of 0.7 millimeter; the highest inert layer is in the form of gravel of 0.8 to 2 mm. and the following layers are of 2 to 5 mm. and 4 to 9 mm. respectively.

Below the perforated plate, there is an empty space of 0.56 m. above the outlet nozzle. A polyester spider which supports the plate is arranged there. The feeding is affected through a pipe of a diameter of 50 meters with a rate of flow of 20 $m^3$/hr permitting a velocity of flow in the useful zone at a velocity of 1.77 mm./sec corresponding well to the conditions required for the effectiveness of the treatment.

The invention also concerns the technique of producing columns in order to make it possible, upon their industrial production, to optimize their construction and minimize operating costs. The hard materials customarily used in chemical engineering (glass or metals) can be replaced by less costly materials, since there are no large mechanical stresses due to high pressures. In particular, one can select materials which have a certain elasticity, such as fiberglass reinforced polyester, which will contribute, aside from the partial filling with reagent of the cylindrical part already mentioned, in restraining possible expansions of the reagent during the production cycle.

The possibility of industrially producing columns of large diameter and small height results directly from the specific features of the columns of the present invention. This is a determining factor of economy in the cost of construction, but also in the operating expenses, for instance by extending the useful life of the reagents.

The very principle of regulating the flow by successive layers of inert products implies perfect horizontality of these layers and therefore of the plate which supports them. Its small diameter is a favorable factor and one eliminates any risk of sagging by the suitable placement of angle irons on the periphery and a spider along four radii.

Although one column according to the invention as well as details of manufacture and manners of operation have been described and shown, it is to be understood that the present invention is not limited to these particular examples but that it extends to any apparatus for treatment in heterogeneous phase which comprises the general features set forth above.

I claim:

1. A reaction column for the passage of a liquid solution, said column comprising a solid static component divided into grains for contacting a liquid solution, a vertical enclosure defining at least two orifices for the passage of said solution, one at its upper part and the other at its lower part, said static component being located in said upper part, means for maintaining the pressure in the lower part of the column substantially equal to the height of the solution in the column so that the flow of the solution through the static component results primarily from its gravity;

the lower part of said enclosure being of a generally substantially conical shape and tapering away from said upper part; and outlet means connected to the lower end of the cone; and the pressure maintaining means comprising a mass of divided materials which are inert with respect to said solution, said materials partially filling the inner volume of said conical part and being arranged in horizontal layers formed of particles of a size which increases discontinuously from their upper layer to their lower layer, while the density of the particles are at least equal to that of the static component, the density of the particles of the lower layers being at least equal to that of the upper layers, there being no free space between the static component and the upper layer.

2. A column according to claim 1, wherein there is a free height above the static component.

3. A column according to claim 2, wherein the opening angle of the cone of the lower part is between 25° and 35°.

4. A column according to claim 2, which further comprises an upper conduit and wherein said outlet means is a lower conduit, the lower conduit being connected axially to the lower end of the cone; a 4-way valve connected to said conduits; and an inlet conduit and an outlet conduit communicating with said 4-way valve, said valve alternately placing the upper conduit in communication with the inlet conduit and the lower conduit in communication with the outlet conduit.

5. A column according to claim 4, wherein the said column comprises at least two level detectors which detect the presence of the solution, one of said level detectors comprising a high level detector located below the column, and the other level detector comprising a low level detector located above the upper level of the said static component.

6. A column according to claim 2, wherein that the upper part of the enclosure is cylindrical, the ratio of its height H to its diameter D being at least equal to 1.2 (H=1.2D).

7. A column according to claim 6, wherein the lower surface of the lower layer of inert material is located at a distance h1 from the lower end of the cone, h1 being between 0.25D and 0.34D.

8. A column according to claim 2, wherein
   the smallest dimension of the particles of a layer is larger than the largest dimension of the interstices present between the particles of the immediately lower layer; and
   the largest dimension of the interstices present between the particles of the upper layer is less than the smallest dimension of the grains of the static component.

9. A column according to claim 8 wherein the inert materials are divided into three layers of particles of different particle size, the particle size of the particles of the same layer being substantially homogeneous.

10. A column according to claim 8, which further comprises a grating for supporting the inert materials and including openings having dimensions smaller than the smallest dimension of the particles of the adjacent layer; and a spider for supporting the grating.

* * * * *